No. 811,896. PATENTED FEB. 6, 1906.
U. C. ALLEN.
PROCESS OF TREATING WASTE FIBER.
APPLICATION FILED MAR. 26, 1904.

2 SHEETS—SHEET 2.

U. Cornell Allen, Inventor

Witnesses

UNITED STATES PATENT OFFICE.

URIAH CORNELL ALLEN, OF SANDYHILL, NEW YORK.

PROCESS OF TREATING WASTE FIBER.

No. 811,896.  Specification of Letters Patent.  Patented Feb. 6, 1906.

Application filed March 26, 1904. Serial No. 200,190.

*To all whom it may concern:*

Be it known that I, URIAH CORNELL ALLEN, a citizen of the United States, residing at Sandyhill, in the county of Washington and State of New York, have invented a new and useful Process of Treating Waste Fiber, of which the following is a specification.

My present invention relates to a novel process for the treatment of waste fiber, particularly cotton-waste of the character discharged from cotton-gins or from cotton-seed-delinting machines.

It is well understood by those skilled in the art that the waste from cotton-gins contains a considerable quantity of cotton, which is ordinarily lost. This waste is composed of cotton, motes, (undeveloped seeds,) grabots, (pieces of hull,) and various other trash—such as pieces of leaves, twigs, &c.—and a fine dust or dirt, which latter is of a poisonous nature and is exceedingly injurious to the health of operators working in an atmosphere laden therewith.

The object of my invention is to effect the separation of the fiber from the various other particles, or, in other words, to clean the fiber so that the cotton which is ordinarily lost may be saved and utilized.

Figure 1:
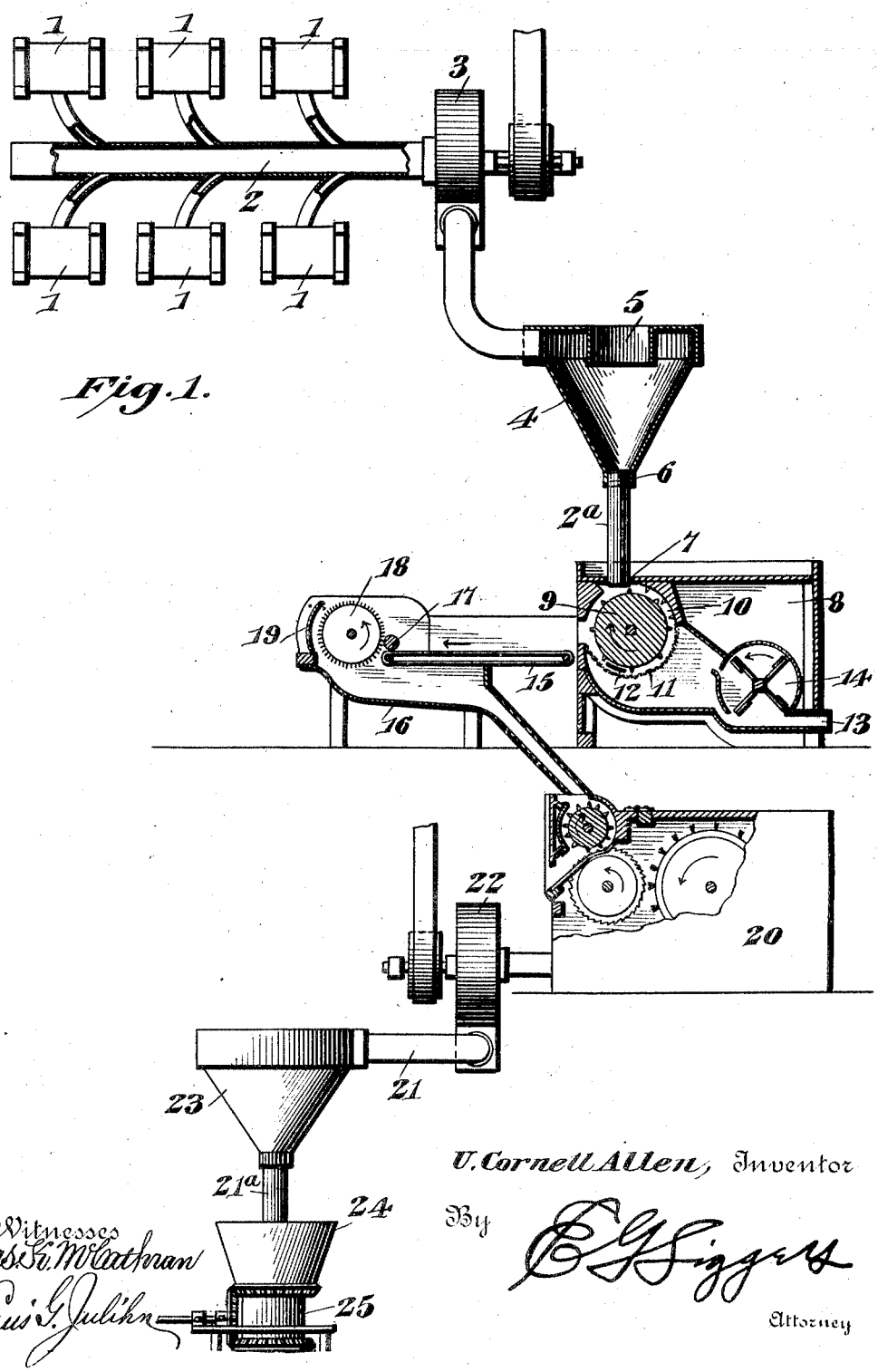
Figure 2:
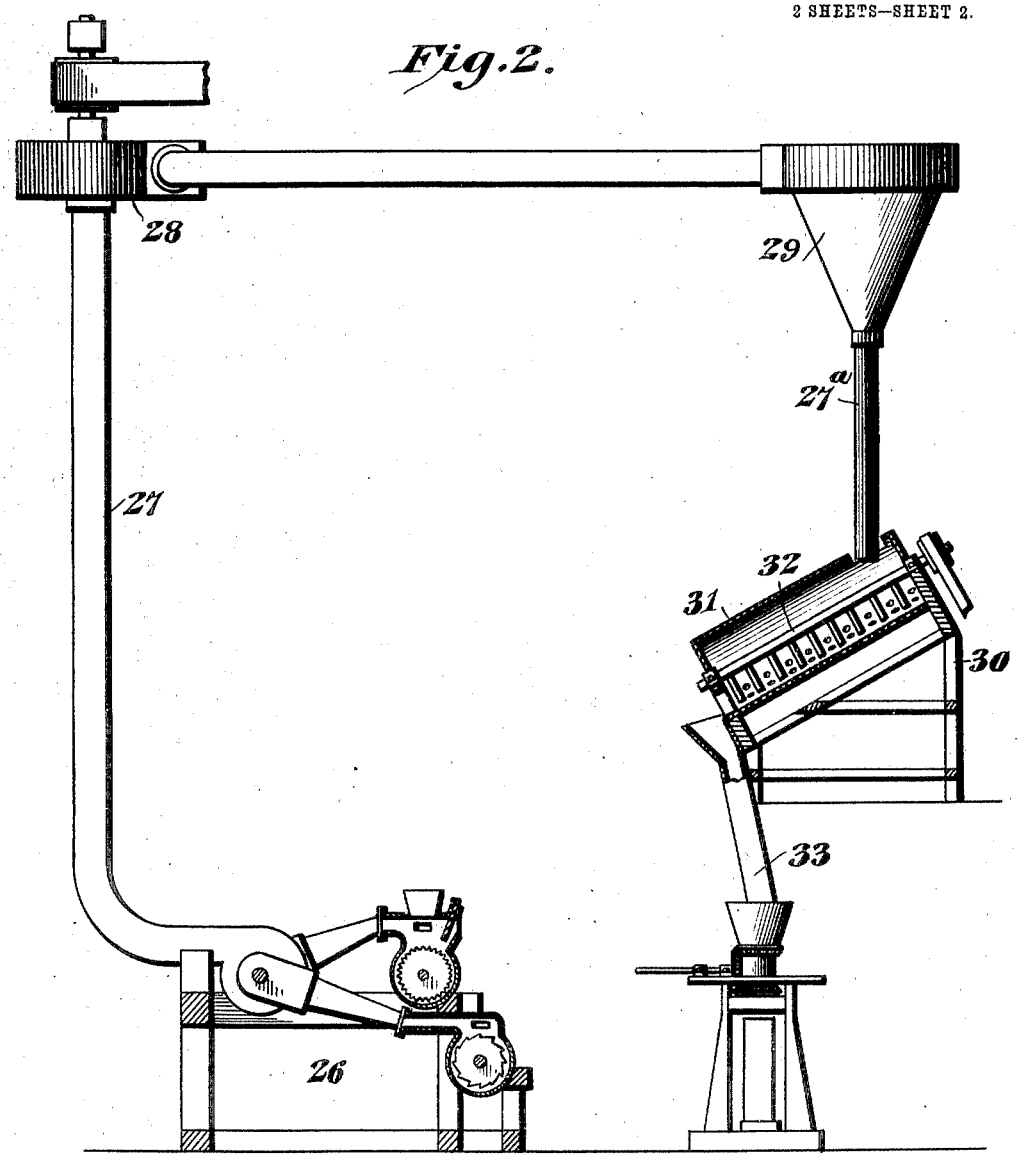

In the accompanying drawings, Figure 1 is a sectional elevation, partly in diagram, of one form of apparatus for carrying out my process in connection with mote and grabot cotton, and Fig. 2 is a similar view of one form of apparatus for practicing the process in connection with lint cotton removed from cotton-seeds by a delinting-machine.

Referring first to the apparatus shown in Fig. 1, 1 indicates a battery of gins, 2 a waste-flue common to all of the gins of the battery, and 3 a fan-blower located in the flue between the gins and a centrifugal separator 4, with which the waste-flue communicates at one end. The centrifugal separator 4 is in the form of a conical chamber, with the upper or large end of which the flue 2 communicates in a tangential direction. At the upper end of this chamber is located a comparatively large central outlet-opening 5 for the escape of air and fine dust, and at its lower end is a comparatively small opening 6, through which the cotton passes to a flue-section $2^a$, leading to the feed-opening 7 of a cleaning-machine 8. This cleaning-machine, exemplified in Reissue Patent No. 7,074, dated April 25, 1876, comprises a casing in which is located a toothed cylinder 9, disposed below the feed-opening 7 and operating opposite a hackle-breast 10 and a screen 11, the size of the mesh of the latter being sufficient to permit the escape of the smaller particles of trash in the cotton, but insufficient for the passage of the motes, to which a considerable portion of the cotton fiber to be saved is attached. The casing is also provided with air inlet and outlet openings 12 and 13 at opposite sides of the screen 11, and between said screen and the outlet-opening is located a suction-fan 14, designed to draw the smaller particles of trash through the screen 11 and to discharge the waste thus collected through the outlet-opening 13, from whence it may be conveyed by any suitable means to the fire-box and burned. The function of this cleaning-machine is to remove the smaller particles of trash from the cotton by suction before such particles have been thoroughly intermixed with the fiber by such manipulation of the latter as is necessary to detach and remove the larger particles of trash—as, for instance, grabots or the like. From the cleaning-machine the partially-cleaned fiber is deposited upon the feed-belt 15 of a well-known form of separating-machine 16, provided with feed-rollers 17 and a toothed separating-cylinder 18, which latter rotates at a very high rate of speed, preferably from one thousand to five thousand revolutions a minute. The fiber is caught by the teeth of this cylinder and the rapid rotation of the latter disintegrates said fiber and causes the larger particles of trash to be thrown outward and rearward over the edge of an adjustable guard 19, the position of this guard with reference to the cylinder depending, of course, upon the nature of the fiber being treated. It will be understood that as the cotton passes between the cylinder 18 and the roller 17 it is compressed upon the cylinder, so that while the cotton is gradually loosened by the action of centrifugal force it is not released from the teeth until it reaches the lower side of the cylinder, the outer end of the belt 15 acting as a doffer when the accumulation on the cylinder is sufficient to necessitate the assistance of the centrifugal force by a positive doffing means. The separating-machine does not remove the motes, and the latter pass down under the cylinder with the cleaned fiber and are fed forward by the current of air induced by the rotation of the cylinder. From the separating-machine the cleaned mote-cotton is led to a mote-gin 20, (exemplified in Patent No. 375,115,) by which the motes are separated from the cotton in a manner well understood in the art, and said cotton is thence conveyed by means of a flue 21, including a blower 22, to a second centrifugal separator 23, similar to the separator 4. The separator 23 removes the last vestige of dust from the cotton, and the latter is discharged through a section 21ª of the flue 21 to the feed-box 24 of the press 25.

It should be borne in mind that the fine dust held in large quantities by the waste product of the gins is not only exceedingly injurious to the operator, but is exceedingly difficult to remove if thoroughly intermixed with the fiber by the mechanical action which is necessary in order to effect the removal of the trash. For these reasons it is not only essential for the fine dust to be removed from the fiber, but it is equally essential that its removal be effected as the initial step in the cleaning of the waste. From this it will appear that the location of the centrifugal separator 4 in advance of the cleaning-machine 8 is material, since the waste immediately after its delivery from the gins or other source of supply will be subjected to the action of a gyrating current of air, serving to throw the cotton outwardly by centrifugal force against the walls of the separator 4, the cotton gradually moving down and escaping through the bottom of the separator and the dust-laden air escaping through the opening 5. Thus at the very outset of the process of elimination the finest particles to be removed—i. e., the injurious dust—are extracted from the waste and discharged outside of the building. The next step of the process contemplates the removal of the smaller pieces of trash by suction before the fiber has been manipulated in a manner to cause these smaller particles to be worked into the fibrous mass. The next step contemplates the violent disintegration of the fiber and the removal of the larger pieces of trash by a combination of centrifugal force and the action of the guard 19, said guard acting as a picker—that is to say, the large pieces of trash, urged outward by centrifugal force as the mass of cotton rotates, will strike the edge of the guard, which will thus assist in their removal. The next step contemplates the removal of the motes, and the final step has for its end the liberation of any dust which may yet remain by subjecting the cleaned fiber for a second time to the action of a gyrating current of air.

The utility of effecting the removal of the dust as the initial step of the process has been pointed out and attention is now directed to the fact that the order in which the second and third steps of the process are practiced is equally material, because it is necessary to remove the smaller particles of debris before they have been worked thoroughly into the mass of fiber, and it is impossible to remove the larger pieces of trash by suction, because in that event the motes carrying the fiber would also be removed and lost. By practicing these steps in the order named, however, the smaller trash is first removed and the larger trash is thereafter separated from the fiber by instrumentalities neither of which is effective to remove the motes. In consequence the mote-cotton is thoroughly cleaned and the fiber clinging to the motes is saved by the subsequent operation of the mote-gin. At this point it is proper to remark that since the capacity of the mote-cleaning machine is much greater than that of the separating-machine it is desirable in practice to employ a plurality of separating-machines and mote-gins for each cleaning-machine. It is deemed unnecessary to illustrate this obvious variation, since it does not modify the process. It may also be noted that the second centrifugal separator may in some instances be dispensed with, and when my process is practiced for the purpose of cleaning fiber other than mote and grabot cotton certain other of the enumerated steps may be omitted. For instance, in Fig. 2 I have shown an apparatus for carrying out my process in connection with lint cotton. 26 indicates a cotton-seed-delinting machine of ordinary type, from which is led a waste-flue 27, containing a fan-blower 28 and a centrifugal separator 29 similar to the separator 4 in Fig. 1. The lint drawn through the waste-flue 27 from the delinting-machine is blown into the separator 29, within which it is gyrated by a current of air supplied by the blower, and the dust is expelled in an obvious manner. From the separator the lint passes through a flue-section 27ª to a cleaning-machine 30. This cleaning-machine or separator includes an inclined foraminous shell 31, within which operates a rotary agitator 32, which agitates the fiber and permits the escape of foreign substances through the openings in the shell. The cleaned fiber is then fed directly through a flue 33 to the press, or, if necessary, a second blower and centrifugal separator may be located in advance of the press, as in that form of apparatus heretofore described.

It is thought that from the foregoing the manner of practicing my novel process for cleaning waste fiber will be clearly apparent; but I wish it to be distinctly understood that I do not confine myself to the employment of the particular apparatus described, as on the contrary I reserve the right to vary the construction and arrangement illustrated in the accompanying drawings to any extent which may be desirable in carrying out the process as defined in the appended claims.

What I claim is—

1. The process of treating waste fiber which consists in first subjecting it to the action of a gyrating current of air to remove the dust, and thereafter disintegrating the fibrous mass and separating the trash therefrom.

2. The process of treating waste fiber which consists in first subjecting it to a gyrating current of air to remove the dust, next separating the small particles of trash, and finally separating the large pieces of trash from the fiber.

3. The process of treating waste fiber which consists in first subjecting it to a gyrating current of air to remove the dust, next separating the small particles of trash, next separating the large pieces of trash from the fiber, and finally again subjecting the fiber to the action of a current of air to remove the dust remaining.

4. That process of treating mote-cotton which consists in first subjecting it to the action of a gyrating current of air to remove the dust, next separating the small particles of trash by suction, and thereafter disintegrating the fibrous mass and separating the large pieces of trash therefrom.

5. The process of treating mote-cotton which consists in first subjecting it to a gyrating current of air to remove the dust, next removing the small particles of trash by suction, and thereafter rotating the fibrous mass at high speed to separate the large pieces of trash by centrifugal force.

6. That process of treating mote-cotton which consists in first subjecting it to the action of a gyrating current of air to remove the dust, next separating the small particles of trash by suction, next rotating the fibrous mass at high speed to separate the large pieces of trash by centrifugal force, and thereafter separating the motes from the cotton.

7. That process of treating mote-cotton which consists in subjecting it to the action of a gyrating current of air to remove the dust, next removing the small particles of trash by suction, next separating the large pieces of trash by centrifugal force, next separating the motes from the cotton, and finally again subjecting the cotton to the action of a gyrating current of air to remove any dust remaining.

In testimony that I claim the foregoing as my own I have hereto affixed my signature in the presence of two witnesses.

URIAH CORNELL ALLEN.

Witnesses:
ALTON J. MINTON,
A. CORCORAN.